No. 811,405. PATENTED JAN. 30, 1906.
P. JIGOUZO.
ELECTRIC MOTOR.
APPLICATION FILED OCT. 18, 1904.

Witnesses:—
Albert Jones
Samuel Percival

Inventor
Paul Jigouzo
By his Attorneys
Wheatley & Mackenzie

UNITED STATES PATENT OFFICE.

PAUL JIGOUZO, OF VANVES, FRANCE.

ELECTRIC MOTOR.

No. 811,405.  Specification of Letters Patent.  Patented Jan. 30, 1906.

Application filed October 18, 1904. Serial No. 228,981.

*To all whom it may concern:*

Be it known that I, PAUL JIGOUZO, a citizen of the French Republic, residing at 78 Rue Jullien, Vanves, Seine, France, have invented certain new and useful Improvements in Electric Motors; and I do hereby declare the following to be a full, clear, and exact description of the invention, such as will enable others skilled in the art to which it appertains to make and use the same.

This invention relates to a device for automatically and progressively starting monophase or polyphase motors having a rotary field and a short-circuited armature.

Owing to the device being absolutely automatic in its action, the making of wrong connections when the motor is started by the person intrusted with the starting thereof is avoided. Such occurrences are frequent with motors where the coils are wound in phases or even simply formed by two short-circuited armature-windings which are placed in parallel as soon as the motor is started. With progressive starting shocks over the network of wires are avoided, as in this way the motor can be started in two, three, four, or other periods, which has not been possible hitherto except with motors the armatures of which are formed of phase-windings in which auxiliary resistances are introduced. Moreover, the armature being permanently short-circuited, all frictional parts which are a frequent cause of accidents or unsatisfactory working and require constant supervision are entirely dispensed with. Finally, this arrangement gets rid of everything likely to produce sparks in the motor, an important point in regard to certain places—those affected by fire-damp, for example.

Figure 1:
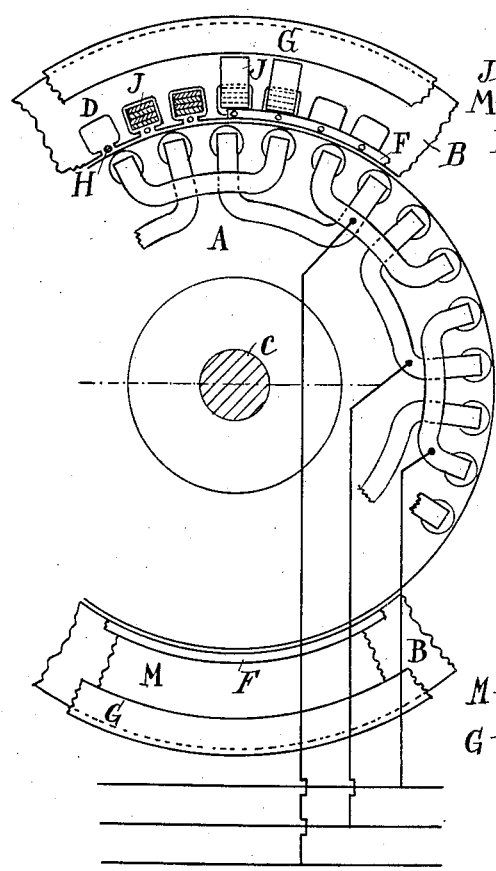
Figure 2:
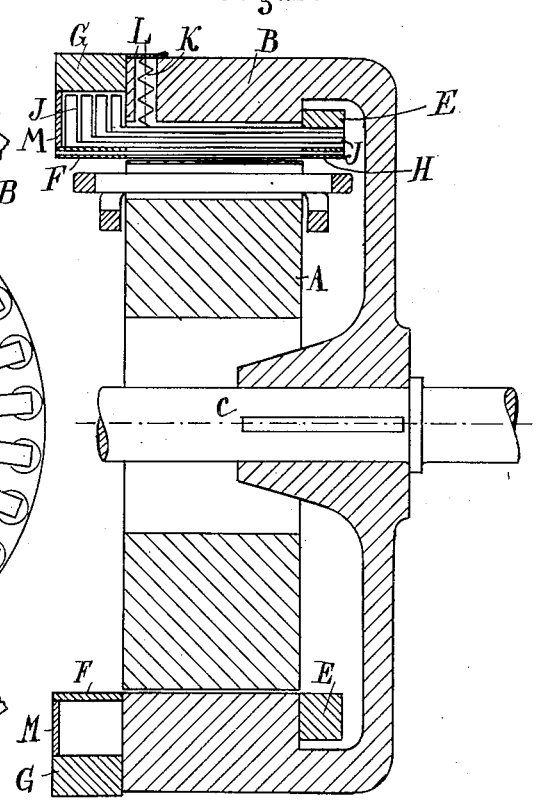

In the accompanying drawings, Figure 1 is an end view, and Fig. 2 a sectional view, of a motor constructed according to this invention.

A part only of the armature ring or rotor is shown. The armature is outside the field-magnet; but the device is equally applicable when the armature is inside the fixed field-magnet or stator.

A is the fixed field-magnet or stator, wound in the usual manner; B, the rotor or movable armature, keyed to the shaft C.

D represents the notches of any preferred form in the rotor.

E is a ring, either single of slight electrical resistance or double, but with small resultant of electrical resistance.

F is a ring of considerable electrical resistance; G, a ring of slight electrical resistance; H, a bar of considerable electrical resistance.

J represents bars of slight electrical resistance, K a spring resting on the bars J, and L is a piece against which the spring K lodges.

In each notch D there are generally two kinds of bars—first, a strong rigid bar H, soldered or riveted to the rings E and F and employed in starting the motor; secondly, a flexible bar J, formed of one or more thin conducting-plates of the same or of different thickness. One of the ends of this bar is fixed to the ring E. The other end is free and when the motor is in action comes against the ring G. When the motor it as rest, the end of the bar is removed from the ring, either by means of a small spring K or, in consequence of its inherent flexibility, without any spring.

The action of such a device is easily understood. When the motor is started, the bars J do not rest on the ring G. The bars H alone form with the base-rings E and F a short-circuited armature of great resistance. In consequence of this the motor supplied with current by the supply-conductors starts with a starting-couple which may be high and a demand on the current that may be but slight. In proportion as the motor is started the flexible plates which form the bars J diverge toward the exterior under the influence of centrifugal force, the ends of the bars coming against the ring G, these bars forming, with the rings E and G, a second armature of very slight resistance, which automatically shunts the first starting-armature when the motor is in action.

The thickness of the plates which form the bar J and the flexibility of the springs K may vary, so that the contact above referred to is effected at different moments during the starting, thus enabling the starting to be effected progressively. These springs may be placed at any point of the bars J, even at the free end thereof. Moreover, in the case of a massive field-magnet the starting may be effected simply by means of the parasitic induced currents, and the starting-bars H may be dispensed with.

In order to reduce the contact resistance of the bars J and the ring G, the ends of the bars J may be made stouter.

For the purpose of preventing the presence of dust between the contacts the whole device may be so arranged that the contacts are in some way comprised in an impermeable casing formed by the disk M.

What I claim, and desire to secure by Letters Patent, is—

1. A device for automatically and progressively starting monophase or polyphase motors with a rotating field, in which the current is induced in the armature by short-circuiting its coils, the combination with the armature of conducting-rings adapted when connected to short-circuit the armature, and a series of flexible bars or conductors supported adjacent to the rings and adapted when the motor is started to be pressed against one of the rings by centrifugal action to electrically connect them and thus short-circuit the armature, substantially as described.

2. A device for automatically and progressively starting monophase or polyphase motors with a rotating field, in which the current is induced in the armature by short-circuiting its coils, the combination with the armature of conducting-rings adapted when connected to short-circuit the armature, a series of flexible bars or conductors supported adjacent to the rings and adapted when the motor is started to be pressed against one of the rings by centrifugal action to electrically connect them and thus short-circuit the armature, and means for withdrawing the bars from making contact when the motor is stopped, substantially as described.

3. A device for automatically and progressively starting monophase or polyphase motors with a rotating field, in which the current is induced in the armature by short-circuiting its coils, the combination with the armature of conducting-rings adapted when connected to short-circuit the armature, a series of flexible bars or conductors supported adjacent to the rings and adapted when the motor is started to be pressed against one of the rings by centrifugal action to electrically connect them and thus short-circuit the armature, and a permanently-short-circuited armature-coil for starting the motor, substantially as described.

4. A device for automatically and progressively starting monophase or polyphase motors with a rotating field, in which the current is induced in the armature by short-circuiting its coils, the combination with the armature of conducting-rings adapted when connected to short-circuit the armature, a series of flexible bars or conductors supported adjacent to the rings and adapted when the motor is started to be pressed against one of the rings by centrifugal action to electrically connect them and thus short-circuit the armature, a permanently-short-circuited armature-coil for starting the motor, and springs of different strength arranged to act on the bars to withdraw them out of contact when the motor stops, and to effect progressive contact of the bars at starting, substantially as described.

In testimony whereof I have affixed my signature in presence of two witnesses.

PAUL JIGOUZO.

Witnesses:
CHARLES JABO,
EMOND DUROW.